US008101533B2

(12) United States Patent
Hirai

(10) Patent No.: US 8,101,533 B2
(45) Date of Patent: Jan. 24, 2012

(54) FABRIC TREATING COMPOSITION, DETERGENT AND SOFTENER, AND FABRIC ARTICLE TREATED THEREWITH

(75) Inventor: Motohiko Hirai, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 428 days.

(21) Appl. No.: 12/468,427

(22) Filed: May 19, 2009

(65) Prior Publication Data

US 2010/0151758 A1 Jun. 17, 2010

(30) Foreign Application Priority Data

Dec. 15, 2008 (JP) ................................ 2008-317913

(51) Int. Cl.
*B32B 5/02* (2006.01)
*B32B 27/04* (2006.01)
*B32B 27/12* (2006.01)
*C08G 77/04* (2006.01)

(52) U.S. Cl. ............ 442/99; 442/97; 442/102; 442/107; 528/33

(58) Field of Classification Search .................... 442/97, 442/102, 107, 99
See application file for complete search history.

(56) References Cited

U.S. PATENT DOCUMENTS

| | | | |
|---|---|---|---|
| 4,978,363 | A | 12/1990 | Ona et al. |
| 5,688,889 | A | 11/1997 | Canivenc et al. |
| 5,798,107 | A | 8/1998 | Vogel et al. |
| 6,255,429 | B1 | 7/2001 | Griffin et al. |
| 7,078,553 | B2 | 7/2006 | Van De Bovenkamp-Bouwman et al. |
| 7,341,674 | B1 | 3/2008 | Trinh et al. |
| 2002/0193273 | A1 | 12/2002 | Richards, III et al. |
| 2004/0053810 | A1 | 3/2004 | Tully et al. |
| 2005/0026809 | A1 | 2/2005 | Kvita et al. |
| 2006/0211594 | A1 | 9/2006 | Aubay et al. |

FOREIGN PATENT DOCUMENTS

| | | | |
|---|---|---|---|
| EP | 0 692 567 | A1 | 1/1996 |
| JP | 57-101076 | A | 6/1982 |
| JP | 59-179884 | A | 10/1984 |
| JP | 1-306683 | A | 12/1989 |
| JP | 2-47371 | A | 2/1990 |
| JP | 7-216754 | A | 8/1995 |
| JP | 8-53547 | A | 2/1996 |
| JP | 9-95866 | | 4/1997 |
| JP | 10-46473 | A | 2/1998 |
| JP | 10-508912 | A | 9/1998 |
| JP | 2001-89571 | A | 4/2001 |
| JP | 2002-513097 | A | 5/2002 |
| JP | 2002-531712 | A | 9/2002 |
| JP | 2004-512431 | A | 4/2004 |
| JP | 2005-187987 | A | 7/2005 |

OTHER PUBLICATIONS

European Search Report issued Mar. 23, 2010, in corresponding European Application No. 09252600.3.

*Primary Examiner* — Lynda Salvatore
(74) *Attorney, Agent, or Firm* — Birch, Stewart, Kolasch & Birch, LLP

(57) ABSTRACT

A fabric treating composition comprising primarily an organopolysiloxane of formula (1) having a viscosity of 100 to 1,000,000 mPa-s at 25° C. is provided.

(1)

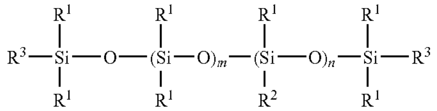

$R^1$ is a monovalent hydrocarbon group, $R^2$ is a monovalent organic group of formula: $—R^4(NR^5CH_2CH_2)_aNR^6R^7$ wherein $R^4$ is a divalent hydrocarbon group, $R^5$ to $R^7$ are hydrogen, monovalent hydrocarbon groups, or $R^8$, $R^8$ is a group of formula: $—(CO—C_5H_{10}O)_b—R^9$ ($R^9$ is hydrogen or a monovalent hydrocarbon group, b is 1 to 50), a is 0 to 4, with the proviso that at least one of $R^5$, $R^6$ and $R^7$ present in the organopolysiloxane is $R^8$, $R^3$ is hydroxyl, $—OR^{10}$, $R^1$, or $R^2$, $R^{10}$ being a monovalent hydrocarbon group, m is 10 to 1,500, and n is 0 to 100, with the proviso that when n=0, at least one $R^3$ is $R^2$.

10 Claims, No Drawings

FABRIC TREATING COMPOSITION, DETERGENT AND SOFTENER, AND FABRIC ARTICLE TREATED THEREWITH

BACKGROUND ART

This invention relates to a fabric treating composition, detergent and softener, which are useful for imparting excellent softness and low-yellowing property to fabric articles such as clothes, and for reducing wrinkles, and fabric articles treated therewith.

In the prior art, dimethylpolysiloxanes epoxy group-containing organopolysiloxanes, and amino group-containing organopolysiloxanes are widely used as a fabric treating agent for imparting softness or other properties to fabric articles. Among others, amino group-containing organopolysiloxanes capable of imparting excellent softness are most often used. Fabric treating agents comprising as an active ingredient organopolysiloxanes having $—C_3H_6NH_2$, $—C_3H_6NHC_2H_4NH_2$ and the like as amino groups are widely used because of excellent softness. Recently they are also used as a softener for liquid detergents.

Fabrics treated with organopolysiloxanes having $—C_3H_6NH_2$, $—C_3H_6NHC_2H_4NH_2$ and the like as amino groups have the drawback that degradation of amino groups occurs by heat, ultraviolet light or other factors due to heat treatment, drying or aging and in particular, white or tint color fabrics or fabric articles change their color to yellow and lose softness.

For the purpose of preventing such yellowing, JP-A 57-101076 discloses reaction of amino group-containing organopolysiloxane with organic acid anhydride or chloride. JP-A 59-179884 discloses reaction with epoxy compounds. JP-A 1-306683 discloses reaction with higher fatty acids. JP-A 2-47371 discloses reaction with carbonates as means for modifying amino groups, which is, in part, commercially practiced. Further, JP-A 8-053547 discloses a cyclohexyl group-containing, amino-modified organopolysiloxane. JP-A 7-216754 and JP-A 10-046473 disclose organopolysiloxanes containing a sterically hindered piperidyl group. JP-A 2001-89571 discloses amine, polyol, and amide-functional organopolysiloxane copolymers.

On the other hand, active efforts have recently been made to develop fabric treating agents for reducing wrinkles in fabric articles, especially cotton articles and polyester/cotton articles, and development of liquid detergents containing fabric treating agents for imparting both softness and wrinkle resistance is also in progress. JP-A 2002-531712 discloses a composition comprising a lubricant a shape retention polymer, a lithium salt and a plasticizer, as a wrinkle control agent. JP-A 2002-513097 discloses a composition comprising a cationic surfactant. JP-A 2005-187987 discloses a composition comprising an ester group-containing cation activator, a silicone compound and at least 1% of a water-soluble polymer. JP-A 2004-512431 discloses use of water-insoluble polymer nano-particles. Moreover, JP-A 10-508912 discloses a method for spray treatment with a water-soluble composition comprising an effective amount of silicone and a film former. JP-A 9-95866 discloses a shape-retaining fabric wherein a polylactone-containing crosslinking thermoplastic resin is irradiated with actinic energy radiation.

However, these methods are less effective in reducing wrinkles, and a fabric treating agent having excellent softness and low-yellowing property is not available.

SUMMARY OF INVENTION

An object of the invention is to provide a fabric treating composition, detergent and softener, which are useful for imparting excellent softness and low-yellowing property to fabric articles such as clothes, and for reducing wrinkles at the same time, and a fabric article treated therewith.

Making extensive investigations to attain the above object, the inventor has found that when fabric articles such as clothes are treated with a fabric treating composition comprising primarily a novel polycaprolactone/amino-containing organopolysiloxane having a viscosity (absolute viscosity) of 100 to 1,000,000 mPa-s at 25° C. as measured by a rotational viscometer to be described later, and preferably in emulsion form dispersed in water with the aid of a surfactant, the composition can impart excellent softness and low-yellowing property to the fabric articles and reduce wrinkles at the same time. The invention is predicated on this finding.

The invention provides a fabric treating composition comprising primarily an organopolysiloxane of the general formula (1) having a viscosity of 100 to 1,000,000 mPa-s at 25° C.

(1)

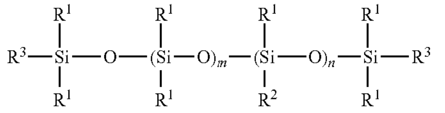

Herein $R^1$ is an unsubstituted monovalent hydrocarbon group of 1 to 20 carbon atoms, $R^2$ is a monovalent organic group of formula (i):

$$—R^4(NR^5CH_2CH_2)_aNR^6R^7 \quad \text{(i)}$$

wherein $R^4$ is a divalent hydrocarbon group of 1 to 6 carbon atoms, $R^5$, $R^6$ and $R^7$ are hydrogen, same or different monovalent hydrocarbon groups of 1 to 6 carbon atoms, or $R^8$, $R^8$ is a group of formula (ii):

$$—(CO—C_5H_{10}O)_b—R^9 \quad \text{(ii)}$$

wherein $R^9$ is hydrogen or a monovalent hydrocarbon group of 1 to 6 carbon atoms, b is an integer of 1 to 50, a is an integer of 0 to 4, with the proviso that at least one of $R^5$, $R^6$ and $R^7$ present in the organopolysiloxane is $R^8$, $R^3$ is a group selected from hydroxyl, $—OR^{10}$, $R^1$, and $R^2$, wherein $R^{10}$ is a monovalent hydrocarbon group of 1 to 6 carbon atoms, m is an integer of 10 to 1,500, and n is an integer of 0 to 100, with the proviso that when n=0, at least one $R^3$ is $R^2$.

In formula (1), a is preferably 0 or 1; all $R^5$, $R^6$ and $R^7$ are preferably $R^8$; and $R^9$ is preferably hydrogen. The fabric treating composition is preferably in emulsion form. Also the fabric treating composition is capable of imparting wrinkle resistance to fabric articles.

The invention further provides a detergent and softener (or soft finisher) for fabric articles comprising an organopolysiloxane of formula (1). A fabric article treated with an organopolysiloxane of formula (1) is also provided.

The fabric treating composition comprising primarily an organopolysiloxane as defined in the invention imparts at least equivalent softness, as compared with conventional fabric treating agents comprising primarily an amino-containing organopolysiloxane, provides low yellowing property, and reduces wrinkles. The organopolysiloxane finds a wide range of use as a general fabric treating agent or an additive to detergents and softeners.

DESCRIPTION OF EMBODIMENTS

The fabric treating composition of the invention comprises an organopolysiloxane of the general formula (1) having a viscosity of 100 to 1,000,000 mPa-s at 25° C. as a main component.

(1)

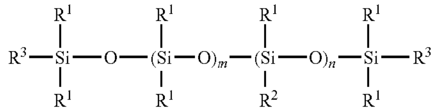

Herein $R^1$ is an unsubstituted monovalent hydrocarbon group of 1 to 20 carbon atoms, $R^2$ is a monovalent organic group of formula (i):

$$—R^4(NR^5CH_2CH_2)_aNR^6R^7 \quad (i)$$

(wherein $R^4$ is a divalent hydrocarbon group of 1 to 6 carbon atoms, $R^5$, $R^6$ and $R^7$ are hydrogen, same or different monovalent hydrocarbon groups of 1 to 6 carbon atoms, or $R^8$, $R^8$ is a group of formula (ii):

$$—(CO—C_5H_{10}O)_b—R^9 \quad (ii)$$

wherein $R^9$ is hydrogen or a monovalent hydrocarbon group of 1 to 6 carbon atoms, b is an integer of 1 to 50, a is an integer of 0 to 4, with the proviso that at least one of $R^5$, $R^6$ and $R^7$ present in the organopolysiloxane is $R^8$), $R^3$ is a group selected from hydroxyl, $—OR^{10}$, $R^1$, and $R^2$ (wherein $R^{10}$ is a monovalent hydrocarbon group of 1 to 6 carbon atoms), m is an integer of 10 to 1,500, and n is an integer of 0 to 100, with the proviso that when n=0, at least one $R^3$ is $R^2$.

In the organopolysiloxane of the general formula (1), $R^1$ is an unsubstituted monovalent hydrocarbon group of 1 to 20 carbon atoms. Illustrative examples of $R^1$ include alkyl groups such as methyl, ethyl, propyl, butyl, pentyl, hexyl, octyl, decyl, dodecyl, tetradecyl, octadecyl, and eicosyl; alkenyl groups such as vinyl and allyl; aryl groups such as phenyl; and cycloalkyl groups such as cyclopentyl and cyclohexyl. Inter alia, methyl is most preferred.

$R^2$ is a monovalent organic group of formula (i): $—R^4(NR^5CH_2CH_2)_aNR^6R^7$. In formula (i), $R^4$ is a divalent hydrocarbon group of 1 to 6 carbon atoms, typically alkylene. Examples of $R^4$ include methylene, dimethylene, trimethylene, and tetramethylene, with trimethylene being preferred.

$R^5$, $R^6$ and $R^7$ are hydrogen, same or different monovalent hydrocarbon groups of 1 to 6 carbon atoms, or $R^8$. Illustrative examples of $R^5$, $R^6$ and $R^7$ include hydrogen, or alkyl groups such as methyl, ethyl, propyl, butyl, pentyl, and hexyl, alkenyl groups such as vinyl and allyl, aryl groups such as phenyl, cycloalkyl groups such as cyclopentyl and cyclohexyl, or $R^8$ to be described below. Inter alia, hydrogen and $R^8$ are preferred. Most preferred is $R^8$. At least one, preferably at least two, and more preferably all of $R^5$, $R^6$ and $R^7$ present in the molecule must be $R^8$.

$R^8$ is a monovalent organic group of the general formula (ii):

$$—(CO—C_5H_{10}O)_b—R^9 \quad (ii)$$

wherein $R^9$ is hydrogen or a monovalent hydrocarbon group of 1 to 6 carbon atoms. Illustrative examples of $R^9$ include hydrogen, and monovalent hydrocarbon groups of 1 to 6 carbon atoms, e.g., alkyl groups such as methyl, ethyl, propyl, butyl, pentyl, and hexyl. Inter alia, hydrogen is preferred.

In formula (i), a is an integer of 0 to 4, and preferably 0 or 1. In formula (ii), b is an integer of 1 to 50, and preferably an integer of 1 to 10.

$R^3$ is a group selected from hydroxyl, $—OR^{10}$, $R^1$, and $R^2$ wherein $R^{10}$ is a monovalent hydrocarbon group of 1 to 6 carbon atoms, typically alkyl group. Illustrative examples of $R^3$ include hydroxyl, alkoxy groups such as methoxy, ethoxy, propoxy and butoxy, and the foregoing examples of $R^1$ or $R^2$.

More preferred are methoxy, ethoxy and hydroxyl. It is assumed that at least one of $R^3$ is $R^2$ when n=0.

The subscript m is an integer of 10 to 1,500, preferably an integer of 50 to 1,000. Similarly, n is an integer of 0 to 100, preferably an integer of 0 to 20.

The viscosity at 25° C. of the organopolysiloxane should fall in the range of 100 to 1,000,000 mPa-s because a viscosity of less than 100 mPa-s leads to insufficient softness and a viscosity in excess of 1,000,000 mPa-s makes it difficult to form an emulsion. A viscosity in the range of 1,000 to 500,000 mPa-s is preferred. Notably, the viscosity at 25° C. is as measured by a BM type viscometer (Tokyo Keiki Inc.) for viscosities below 100,000 mPa-s, and as measured by a BH type viscometer (Tokyo Keiki Inc.) for viscosities equal to or more than 100,000 mPa-s.

The organopolysiloxane of formula (1) according to the invention may be obtainable by ring-opening addition polymerization of a conventional known amino-containing organopolysiloxane with ε-caprolactone of formula (3).

(3)

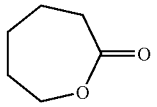

This ring-opening addition polymerization may be performed by heating and stirring the reactants in a solvent such as toluene or xylene, in the presence of a catalyst, typically a titanium base catalyst such as tetraalkoxytitanium.

Examples of the amino-containing organopolysiloxane include conventional known organopolysiloxanes having $—C_3H_6NH_2$, $—C_3H_6NHC_2H_4NH_2$ and the like.

While exemplary lactone monomers which are generally susceptible to ring-opening addition polymerization include ε-caprolactone, δ-valerolactone, γ-butyrolactone, and β-propiolactone, the invention favors ε-caprolactone due to reactivity with amino group, high crystallinity of ring-opening addition polymerized products after crosslinking, and good wrinkle control ability.

The proportion of amino-containing organopolysiloxane to ε-caprolactone used in reaction is preferably such that a molar ratio of ε-caprolactone/amino group is from 1 to 50 and more preferably from 1 to 30.

As to reaction conditions, the preferred reaction runs in a nitrogen blanket at 110° C. for about 4 hours when toluene is used as the solvent.

The fabric treating composition of the invention is processed into solution form by dissolving the organopolysiloxane in organic solvents such as toluene, xylene, n-hexane, n-heptane, methyl ethyl ketone, methyl isobutyl ketone, ethyl acetate, butyl acetate, and mineral turpentine, or into emulsion form by using nonionic, anionic, cationic or ampholytic surfactants, so that fabric articles may be treated therewith.

When the fabric treating composition is processed into emulsion form by emulsifying the organopolysiloxane, the surfactant used is not particularly limited. Examples of nonionic surfactants include ethoxylated higher alcohols, ethoxylated alkyl phenols, polyhydric alcohol fatty acid esters, ethoxylated polyhydric alcohol fatty acid esters, ethoxylated fatty acids, ethoxylated fatty acid amides, sorbitol, sorbitan fatty acid esters, ethoxylated sorbitan fatty acid esters, and sucrose fatty acid esters, which preferably have a HLB value in the range of 5 to 20, and more preferably in the range of 10 to 16. Examples of anionic surfactants include higher alcohol sulfate salts, alkyl phenyl ether sulfate salts, alkylbenzenesulfonic salts, higher alcohol phosphate salts, ethoxylated higher alcohol sulfate salts, ethoxylated alkyl phenyl ether sulfate salts, and ethoxylated higher alcohol phosphate salts. Examples of cationic surfactants include alkyl trimethylammonium chlorides, alkylamine hydrogenchlorides, coconut amine acetate, alkylamine acetates, and alkylbenzene dimethyl ammonium chlorides. Examples of ampholytic surfactants include N-acylamidopropyl-N,N-dimethylammoniobetaines and N-acylamidopropyl-N,N'-dimethyl-N'-β-hydroxypropylammonio-betaines.

An appropriate amount of the surfactant used is 5 to 500 parts by weight and more preferably 10 to 30 parts by weight per 100 parts by weight of the organopolysiloxane. The amount of water used for emulsification may be such as to give a neat organopolysiloxane concentration of 10 to 80% by weight and preferably 20 to 60% by weight.

The emulsion may be prepared by conventional well-known techniques, for example, by mixing the organopolysiloxane with a surfactant and emulsifying the mixture on any emulsifiers such as a homomixer, homogenizer, colloid mill, line mixer, universal mixer, ultra-mixer, planetary mixer, combi-mixer, and three-roll mixer.

If desired, preservatives, anti-rusting agents and other additives may be added to the fabric treating composition of the invention, as long as this does not bring about a substantial deviation from the scope of the invention.

When various fibers, fabrics or fabric articles are treated with the fabric treating composition of the invention, the composition is processed to a desired concentration and applied to the fabric by dipping, spraying or roll coating. The buildup varies over a wide range depending on the type of fabric, although the buildup is usually set in a range of 0.01 to 10% by weight of organopolysiloxane deposited. The fabric may then be dried, for example, by hot air blowing or in a heating oven. Drying may be done at 100 to 150° C. for 2 to 5 minutes although drying conditions vary with the type of fabric.

No particular limits are imposed on the fibers, fabrics or fabric articles which can be treated with the inventive fabric treating composition. The composition is effective to all fabrics including natural fibers such as cotton, silk, hemp, wool, Angora, and mohair, and synthetic fibers such as polyester, nylon, acrylic, and Spandex. Also, no limits are imposed on the form, shape or texture of fabric. Not only raw material forms such as staples, filaments, tows and threads, but also a variety of worked products including woven fabric, knitted fabric, wadding, and non-woven fabric may become objects that can be treated with the inventive fabric treating composition.

By blending the organopolysiloxane of formula (1) in a liquid or granular detergent based on an anionic surfactant, a detergent may be obtained which has the same effects as the inventive fabric treating composition.

Similarly, the organopolysiloxane of formula (1) may be blended in a softener or soft finisher.

In these cases, the organopolysiloxane of formula (1) is preferably used in an amount of 0.5 to 5.0% by weight based on the total weight of the detergent or softener.

EXAMPLE

Examples and Comparative Examples are given below for further illustrating the invention although the invention is not limited to these Examples. In Examples, the viscosity is as measured at 25° C. by a rotational viscometer; the refractive index is as measured according to JIS K-0062; the amine equivalent is as measured by the neutralization titration method; and all percents are by weight.

Example 1

A four-neck separable flask of 1000-ml volume equipped with a condenser, nitrogen inlet, thermometer and stirrer was charged with 400 g of an amino-containing organopolysiloxane of the following formula (A) (viscosity 1,800 mPa-s, amine equivalent 3,800 g/mol), 120 g (corresponding to 5-fold moles relative to entire NH groups in the amino-containing organopolysiloxane) of ϵ-caprolactone of the following formula (3) (molecular weight 114), 300 g of toluene, and 0.2 g of a titanium base catalyst (tetrabutoxytitanium, TBT100 by Nippon Soda Co., Ltd., same hereinafter). The flask was purged with nitrogen gas and closed, after which reaction was allowed to run at 110° C. for 5 hours. After the completion of reaction, a low-boiling fraction was removed under a vacuum of 10 mmHg at 80° C. for 1 hour, yielding 495 g of an oily matter (A-1) having a pale yellow clear appearance, a viscosity of 230,000 mPa-s (25° C.), a refractive index of 1.421 (25° C.), and an amine equivalent unmeasurable (no residual NH groups). The structure of the oily matter was examined by nuclear magnetic resonance spectroscopy ($^1$H-NMR), gel permeation chromatography (GPC), and Fourier transform infrared spectroscopy (FTIR). It was identified to be a polycaprolactone/amino-containing organopolysiloxane in which about 5 moles of caprolactone was added to entire amino groups in the amino-containing organopolysiloxane.

(A)

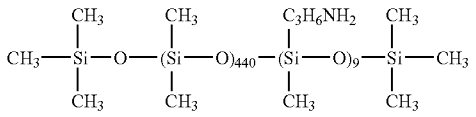

(3)

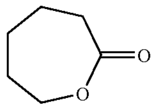

To 350 g of organopolysiloxane (A-1), 105 g of polyoxyethylene tridecyl ether (moles of ethylene oxide added=10 moles, HLB=13.6) and 3.5 g of 30% aqueous solution of polyoxyethylene tridecyl ether sodium sulfate (moles of ethylene oxide added=5 moles) were added and mixed. Then 50 g of deionized water was added, and rapid agitation was performed at a high speed for 15 minutes by a homomixer to facilitate phase inversion and kneading. It was diluted by adding 408.5 g of ion exchange water and agitating at 2,000 rpm for 15 minutes on a homomixer, yielding a translucent emulsion (A-2).

A test liquid for evaluating softness, yellowing and wrinkle resistance was a treating liquid of 15 g of emulsion (A-2) in 500 g of ion exchange water. A Tetron/cotton (65%/35%) mixed broad-cloth (width 200 mm by length 230 mm, for softness and wrinkle resistance tests) and a phosphorescent dyed cotton broad-cloth (for yellowing test) were immersed in separate test liquids for 2 minutes, squeezed through rolls at a squeeze rate of 100%, dried at 100° C. for 2 minutes, and heat treated at 150° C. for 2 minutes, obtaining treated fabric samples. In the yellowing test, the sample was further heat treated at 200° C. for 2 minutes to complete the treated fabric sample. In the wrinkle resistance test, the Tetron/cotton (65%/35%) mixed broad-cloth was dried at 100° C. for 2 minutes and heat treated at 150° C. for 2 minutes, after which it was manually strongly crumpled 60 times in ion exchange water until wrinkles were formed, and spin dried in a washing machine. The cloth was attached to a drying stationary frame, with an angled clip (width 145 mm, weight 70 g, by Crown Co., Ltd.) suspended from the lower side of the cloth, and air dried for 12 hours, before it was observed for wrinkle state.

Softness, yellowing and wrinkle resistance were evaluated according to the following criteria. The results are shown in Table 1.

[Evaluation Criteria]

Evaluation of Softness

Two panelists evaluated the hand by finger touch.

◎: silky slick hand

○: slick hand

Δ: poor slick hand

×: poor

Evaluation of Yellowness

Using a colorimetric color difference meter (ZE2000, Nippon Denshoku Industries Co., Ltd.), a value of "b" was measured. A lower "b" value indicates a higher whiteness or lower yellowness.

Evaluation of Wrinkle Resistance

Two panelists evaluated visually.

1: no wrinkles remaining

2: substantially no wrinkles remaining

3: some wrinkles remaining

4: wrinkles remaining

Example 2

A four-neck separable flask of 1000-ml volume equipped with a condenser, nitrogen inlet, thermometer and stirrer was charged with 400 g of an amino-containing organopolysiloxane of the following formula (B) (viscosity 30,000 mPa-s, amine equivalent 19,000 g/mol), 23 g (corresponding to 5-fold moles relative to entire NH groups in the amino-containing organopolysiloxane) of ϵ-caprolactone of formula (3) (molecular weight 114), 300 g of toluene, and 0.2 g of the titanium base catalyst. The flask was purged with nitrogen gas and closed, after which reaction was allowed to run at 110° C. for 5 hours. After the completion of reaction, a low-boiling fraction was removed under a vacuum of 10 mmHg at 80° C. for 1 hour, yielding 380 g of an oily matter (B-1) having an almost colorless clear appearance, a viscosity of 370,000 mPa-s (25° C.), a refractive index of 1.407 (25° C.), and an amine equivalent unmeasurable. The structure of the oily matter was examined by nuclear magnetic resonance spectroscopy ($^1$H-NMR), gel permeation chromatography (GPC), and Fourier transform infrared spectroscopy (FTIR). It was identified to be a polycaprolactone/amino-containing organopolysiloxane in which about 5 moles of caprolactone was added to entire amino groups in the amino-containing organopolysiloxane.

(B)

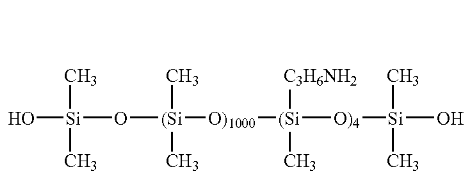

To 350 g of organopolysiloxane (B-1), 105 g of polyoxyethylene tridecyl ether (moles of ethylene oxide added=10 moles, HLB=13.6) and 3.5 g of 30% aqueous solution of polyoxyethylene tridecyl ether sodium sulfate (moles of ethylene oxide added=5 moles) were added and mixed. Then 50 g of deionized water was added, and rapid agitation was performed at a high speed for 15 minutes by a homomixer to facilitate phase inversion and kneading. It was diluted by adding 408.5 g of deionized water and agitating at 2,000 rpm for 15 minutes on a homomixer, yielding a milky white emulsion (B-2). As in Example 1, a treating liquid was prepared using emulsion (B-2), treated cloth samples were obtained, and the properties were evaluated. The results are shown in Table 1.

Example 3

A four-neck separable flask of 1000-ml volume equipped with a condenser, nitrogen inlet, thermometer and stirrer was charged with 200 g of an amino-containing organopolysiloxane of the following formula (C) (viscosity 1,300 mPa-s, amine equivalent 1,700 g/mol), 100 g (corresponding to 5-fold moles relative to entire NH groups in the amino-containing organopolysiloxane) of ϵ-caprolactone of formula (3) (molecular weight 114), 300 g of toluene, and 0.2 g of the titanium base catalyst. The flask was purged with nitrogen gas and closed, after which reaction was allowed to run at 110° C. for 5 hours. After the completion of reaction, a low-boiling fraction was removed under a vacuum of 10 mmHg at 80° C. for 1 hour, yielding 280 g of an oily matter (C-1) having a pale yellow clear appearance, a viscosity of 55,000 mPa-s (25° C.), a refractive index of 1.425 (25° C.), and an amine equivalent of 5,400 g/mol. The structure of the oily matter was examined by nuclear magnetic resonance spectroscopy ($^1$H-NMR), gel permeation chromatography (GPC), and Fourier transform infrared spectroscopy (FTIR). It was identified to be a polycaprolactone/amino-containing organopolysiloxane in which about 5 moles of caprolactone was added to some amino groups in the amino-containing organopolysiloxane.

(C)

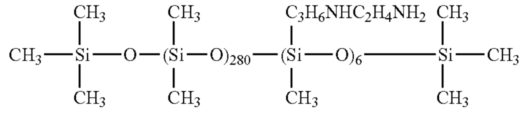

The oily matter (C-1) was emulsified as in Example 1, yielding a translucent emulsion (C-2). As in Example 1, a treating liquid was prepared using emulsion (C-2), treated cloth samples were obtained, and the properties were evaluated. The results are shown in Table 1.

Example 4

A four-neck separable flask of 1000-ml volume equipped with a condenser, nitrogen inlet, thermometer and stirrer was charged with 200 g of an amino-containing organopolysiloxane of the following formula (D) (viscosity 25 mPa-s, amine equivalent 800 g/mol), 344 g (corresponding to 4-fold moles relative to entire NH groups in the amino-containing organopolysiloxane) of ϵ-caprolactone of formula (3) (molecular weight 114), 300 g of toluene, and 0.2 g of the titanium base catalyst. The flask was purged with nitrogen gas and closed, after which reaction was allowed to run at 110° C. for 5 hours. After the completion of reaction, a low-boiling fraction was removed under a vacuum of 10 mmHg at 80° C. for 1 hour, yielding 510 g of an oily matter (D-1) having a pale yellow clear appearance, a viscosity of 2,800 mPa-s (25° C.), a refractive index of 1.439 (25° C.), and an amine equivalent unmeasurable. The structure of the oily matter was examined by nuclear magnetic resonance spectroscopy ($^1$H-NMR), gel permeation chromatography (GPC), and Fourier transform infrared spectroscopy (FTIR). It was identified to be a polycaprolactone/amino-containing organopolysiloxane in which about 4 moles of caprolactone was added to entire amino groups in the amino-containing organopolysiloxane.

(D)

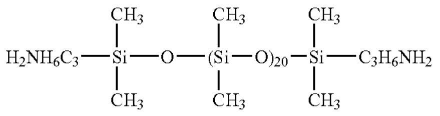

The oily matter (D-1) was emulsified as in Example 1, yielding a translucent emulsion (D-2). As in Example 1, a treating liquid was prepared using emulsion (D-2), treated cloth samples were obtained, and the properties were evaluated. The results are shown in Table 1.

Comparative Example 1

A translucent emulsion was obtained by emulsification as in Example 1 using the reactant, amino-containing organopolysiloxane (A) instead of polycaprolactone/amino-containing organopolysiloxane (A-1) in Example 1. As in Example 1, a treating liquid was prepared using this emulsion, treated cloth samples were obtained, and the properties were evaluated. The results are shown in Table 1.

Comparative Example 2

A milky white emulsion was obtained by emulsification as in Example 1 using the reactant, amino-containing organopolysiloxane (B) instead of polycaprolactone/amino-containing organopolysiloxane (B-1) in Example 2. As in Example 1, a treating liquid was prepared using this emulsion, treated cloth samples were obtained, and the properties were evaluated. The results are shown in Table 1.

Comparative Example 3

A milky white emulsion was obtained by emulsification as in Example 1 using the reactant, amino-containing organopolysiloxane (C) instead of polycaprolactone/amino-containing organopolysiloxane (C-1) in Example 3. As in Example 1, a treating liquid was prepared using this emulsion, treated cloth samples were obtained, and the properties were evaluated. The results are shown in Table 1.

Comparative Example 4

A four-neck separable flask of 1000-ml volume equipped with a condenser, nitrogen inlet, thermometer and stirrer was charged with 400 g of an amino-containing organopolysiloxane of the following formula (A) (viscosity 1,800 mPa-s, amine equivalent 3,800 g/mol), 90 g (corresponding to 5-fold moles relative to entire NH groups in the amino-containing organopolysiloxane) of γ-butyrolactone of the following formula (4) (molecular weight 86), 300 g of toluene, and 0.2 g of the titanium base catalyst. The flask was purged with nitrogen gas and closed, after which reaction was allowed to run at 110° C. for 5 hours. After the completion of reaction, a low-boiling fraction was removed under a vacuum of 10 mmHg at 80° C. for 1 hour, yielding 495 g of an oily matter (E) having a white translucent appearance, a viscosity of 22,000 mPa-s and an amine equivalent of 5,800 g/mol. The structure of the oily matter was examined by nuclear magnetic resonance spectroscopy ($^1$H-NMR), gel permeation chromatography (GPC), and Fourier transform infrared spectroscopy (FTIR). It was identified to be a polybutyrolactone/amino-containing organopolysiloxane in which about 5 moles of butyrolactone was added to some amino groups in the amino-containing organopolysiloxane.

(A)

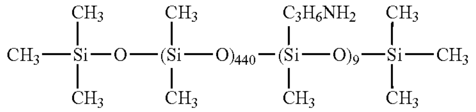

(4)

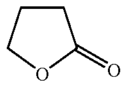

To 350 g of organopolysiloxane (E), 105 g of polyoxyethylene tridecyl ether (moles of ethylene oxide added=10 moles, HLB=13.6) and 3.5 g of 30% aqueous solution of polyoxyethylene tridecyl ether sodium sulfate (moles of ethylene oxide added=5 moles) were added and mixed. Then 50 g of deionized water was added, and rapid agitation was performed at a high speed for 15 minutes by a homomixer to facilitate phase inversion and kneading. It was diluted by adding 408.5 g of deionized water and agitating at 2,000 rpm for 15 minutes on a homomixer, yielding a translucent emulsion. As in Example 1, a treating liquid was prepared using this emulsion, treated cloth samples were obtained, and the properties were evaluated. The results are shown in Table 1.

TABLE 1

| | Organo- | Softness | | Yellowing, | Wrinkle resistance | |
|---|---|---|---|---|---|---|
| | polysiloxane | Panelist A | Panelist B | b value | Panelist C | Panelist D |
| Example 1 | A-1 | ◎ | ◎ | −7.1 | 1 | 2 |
| Example 2 | B-1 | ○ | ○ | −7.2 | 2 | 2-3 |
| Example 3 | C-1 | ◎ | ◎ | −6.9 | 3 | 2-3 |
| Example 4 | D-1 | ○ | ◎ | −6.8 | 2 | 3 |
| Comparative Example 1 | A | ○ | ○ | −6.1 | 4 | 4 |
| Comparative Example 2 | B | Δ | Δ | −6.5 | 4 | 4 |
| Comparative Example 3 | C | ○ | Δ | −5.7 | 4 | 4 |
| Comparative Example 4 | E | ○ | Δ | −6.6 | 4 | 4 |

The invention claimed is:

1. A fabric treating composition comprising primarily an organopolysiloxane of the general formula (1) having a viscosity of 100 to 1,000,000 mPa-s at 25° C., (1)

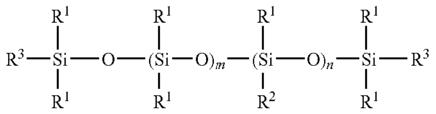

wherein $R^1$ is an unsubstituted monovalent hydrocarbon group of 1 to 20 carbon atoms, $R^2$ is a monovalent organic group of formula (i):

$$—R^4(NR^5CH_2CH_2)_aNR^6R^7 \quad (i)$$

wherein $R^4$ is a divalent hydrocarbon group of 1 to 6 carbon atoms, $R^5$, $R^6$ and $R^7$ are hydrogen, same or different monovalent hydrocarbon groups of 1 to 6 carbon atoms, or $R^8$, $R^8$ is a group of formula (ii):

$$—(CO—C_5H_{10}O)_b—R^9 \quad (ii)$$

wherein $R^9$ is hydrogen or a monovalent hydrocarbon group of 1 to 6 carbon atoms, b is an integer of 1 to 50, a is an integer of 0 to 4, with the proviso that at least one of $R^5$, $R^6$ and $R^7$ present in the organopolysiloxane is $R^8$, $R^3$ is a group selected from hydroxyl, $—OR^{10}$, $R^1$, and $R^2$, wherein $R^{10}$ is a monovalent hydrocarbon group of 1 to 6 carbon atoms, m is an integer of 10 to 1,500, and n is an integer of 0 to 100, with the proviso that when n=0, at least one $R^3$ is $R^2$.

2. The fabric treating composition of claim 1 wherein in formula (1), a is 0 or 1.

3. The fabric treating composition of claim 1 wherein in formula (1), all $R^5$, $R^6$ and $R^7$ are $R^8$.

4. The fabric treating composition of claim 1 wherein in formula (1), $R^3$ is methoxy, ethoxy or hydroxyl.

5. The fabric treating composition of claim 1 wherein in formula (1), $R^9$ is hydrogen.

6. The fabric treating composition of claim 1 which is an emulsion.

7. The fabric treating composition of claim 1 which is to impart wrinkle resistance to fabric articles.

8. A detergent for fabric articles comprising an organopolysiloxane of formula (1) as set forth in claim 1.

9. A softener for fabric articles comprising an organopolysiloxane of formula (1) as set forth in claim 1.

10. A fabric article treated with an organopolysiloxane of formula (1) as set forth in claim 1.

* * * * *